(12) United States Patent
Stallings et al.

(10) Patent No.: US 8,229,411 B2
(45) Date of Patent: Jul. 24, 2012

(54) GRAPHICAL USER INTERFACE FOR MOBILE DEVICE

(75) Inventors: Heath Stallings, Colleyville, TX (US);
Sok Y. Hwang, Dallas, TX (US); Greg Johns, Irving, TX (US); Orland I. Angelo, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 12/346,032

(22) Filed: Dec. 30, 2008

(65) Prior Publication Data
US 2010/0167712 A1    Jul. 1, 2010

(51) Int. Cl.
*G06F 17/00*    (2006.01)

(52) U.S. Cl. .................. 455/418; 455/566; 715/275

(58) Field of Classification Search .............. 345/440, 345/440.1, 440.2; 715/205–208, 210, 214, 715/700, 703, 273, 275, 695, 784
See application file for complete search history.

(56) References Cited

U.S. PATENT DOCUMENTS

| | | | |
|---|---|---|---|
| 6,638,313 B1 * | 10/2003 | Freeman et al. | 715/275 |
| 2003/0149939 A1 * | 8/2003 | Hubel et al. | 715/526 |

* cited by examiner

*Primary Examiner* — Kamran Afshar
*Assistant Examiner* — Kenneth Corbin (57) ABSTRACT

A computing device-implemented method includes displaying a receding timeline configured to fade back toward a horizon, the receding timeline including a starting point at a current time that is updated with a changing time. The method further includes receiving a time-related item from a peripheral application and creating a graphic based on the time-related item. The method also includes displaying the graphic at the starting point of the receding timeline and reducing the graphic size proportionally with the changing time of the receding timeline.

20 Claims, 9 Drawing Sheets

GRAPHICAL USER INTERFACE FOR MOBILE DEVICE

BACKGROUND

Mobile devices (e.g., cell phones, personal digital assistants (PDAs), etc.) can be configured to receive an increasing variety of external and internal communications. For example, a mobile device may receive telephone calls, emails, instant messages (IMs), etc. from other devices. Also, a mobile device may generate reminders based on a calendar or task list.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a graphical user interface with a continually-moving graphical timeline to provide an indication of time-related items. In one implementation, the graphical user interface may be displayed during an idle state of a mobile device (e.g., a cell phone, a PDA, a personal computer, a laptop computer, a remote control, etc.).

The term "time-related item," as used herein, may refer to any message (e.g., an email or voicemail) or indicator (e.g., a reminder from a calendar) received by a mobile device or generated by a mobile device that can be associated with a particular time.

Figure 1:
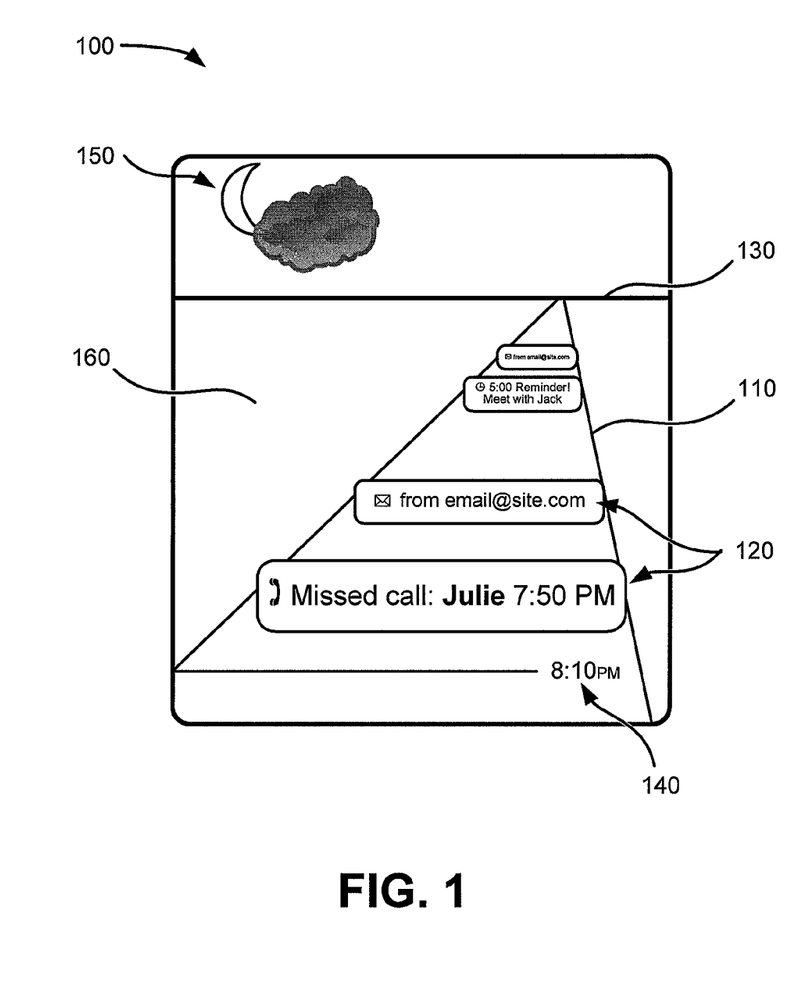
FIG. 1 is a schematic illustrating an exemplary implementation of concepts described herein.

FIG. 1 provides a schematic illustrating an exemplary implementation of concepts described herein. Graphical user interface 100 may include a three-dimensional representation of a moving timeline 110 upon which time-related graphics 120 may be displayed. As will be described in more detail herein, time-related graphics 120 may include information about time-related items in a variety of formats. In one implementation, time-related graphics 120 may appear to rest upon moving timeline 110 and diminish in size as moving timeline 110 scrolls toward a horizon line 130. Thus, time-related graphics 120 may appear to be conveyed (e.g., as on a conveyor belt) toward horizon line 130. A current time indicator 140 may be included at the front of moving timeline 110. A time-related graphic 120 may first be displayed at the front of moving timeline 110 above time indicator 140 when it is first received. The time-related graphic 120 may then appear to recede toward horizon line 130 as the current time becomes increasingly distant from when the time related graphic 120 is first received. In another implementation, time-related graphic 120 may include an indication of a future event, such as an upcoming meeting or another scheduled event. In such an instance, time-related graphic 120 may be displayed to a user on moving timeline 110 before the current time indicator 140.

In an exemplary implementation, as shown in FIG. 1, graphical user interface 100 may also include an environmental indicator 150 and/or a landscape area 160. As will be described in more detail herein, environmental indicator 150 may include astronomic (e.g., sun, moon, etc.) and/or weather indications that change in real time. Additionally, landscape area 160 may include a background image (e.g., scenery) that may be a fixed scene, a customizable scene selected by the user, or a scene that varies based on the geographic location of the mobile device displaying graphical user interface 100.

In another exemplary implementation, each time-related graphic 120 may provide a link (e.g., through a touch-sensitive display) to an application related to the time-related item represented by the time-related graphic 120. For example, in one implementation, a user may select (e.g., touch) a time relate graphic 120 relating to an email message. The touch may cause an email application to launch and/or open the email item indicated in the time-related graphic 120. In another exemplary implementation, a user may scroll along timeline 110 to view previously displayed time-related graphics 120.

Figure 2:
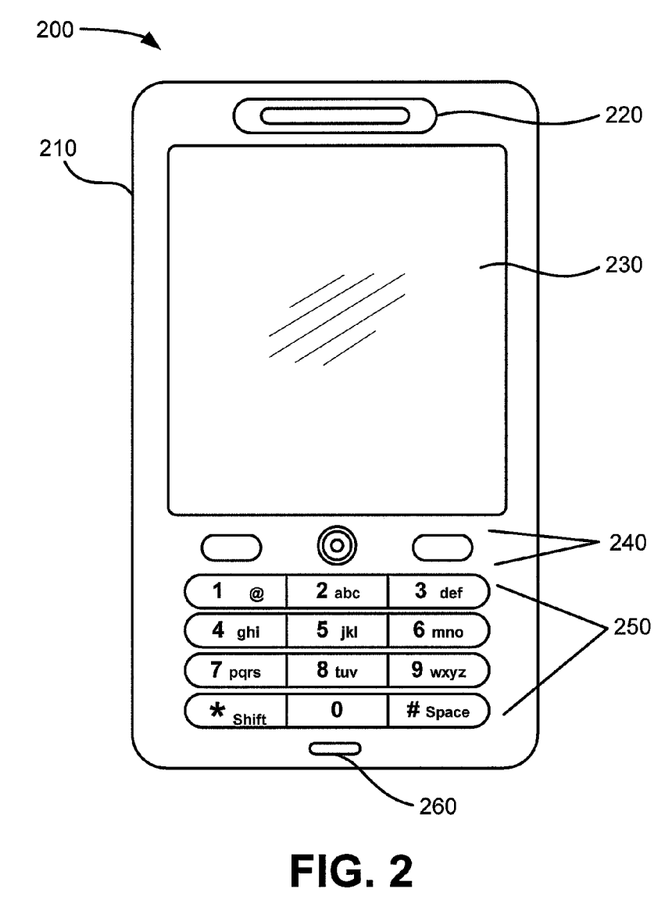
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a personal gaming system, a global positioning system (GPS) unit, or other types of computation or communication devices (e.g., that can receive or generate time-related items), threads or processes running on these devices, and/or objects executable by these devices.

As illustrated in FIG. 2, device 200 may include a housing 210, a speaker 220, a display 230, control buttons 240, a keypad 250, and/or a microphone 260. Housing 210 may protect the components of device 200 from outside elements. Speaker 220 may provide audible information to a user of device 200.

Display 230 may provide visual information to the user. For example, display 230 may display text input into device 200, text, images, video, and/or graphics received from another device, and/or information regarding incoming or outgoing calls or text messages, emails, media, games, phone books, address books, the current time, etc. In one implementation, display 230 may also serve—in conjunction with a touch panel (not shown)—as a user interface to detect user input. For example, display 230 may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology and/or any other type of touch panel overlay that allows display 230 to be used as an input device. In one exemplary implementation, display 230 may display a continuously-moving graphic timeline to present time-related items to a user. In another exemplary implementation, display 230 may accept user input (e.g., a touch) to select a particular time-related item shown on display 230.

Control buttons 240 may permit the user to interact with device 200 to cause device 200 to perform one or more operations. For example, control buttons 240 may be used to cause device 200 to transmit information. Keypad 250 may include a standard telephone keypad (as shown), a QWERTY-like layout (e.g., a traditional configuration of typewriter or computer keyboard keys), or other keypad layout.

Microphone 260 may receive audible information from the user. For example, microphone 260 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of user device 200.

Figure 3:
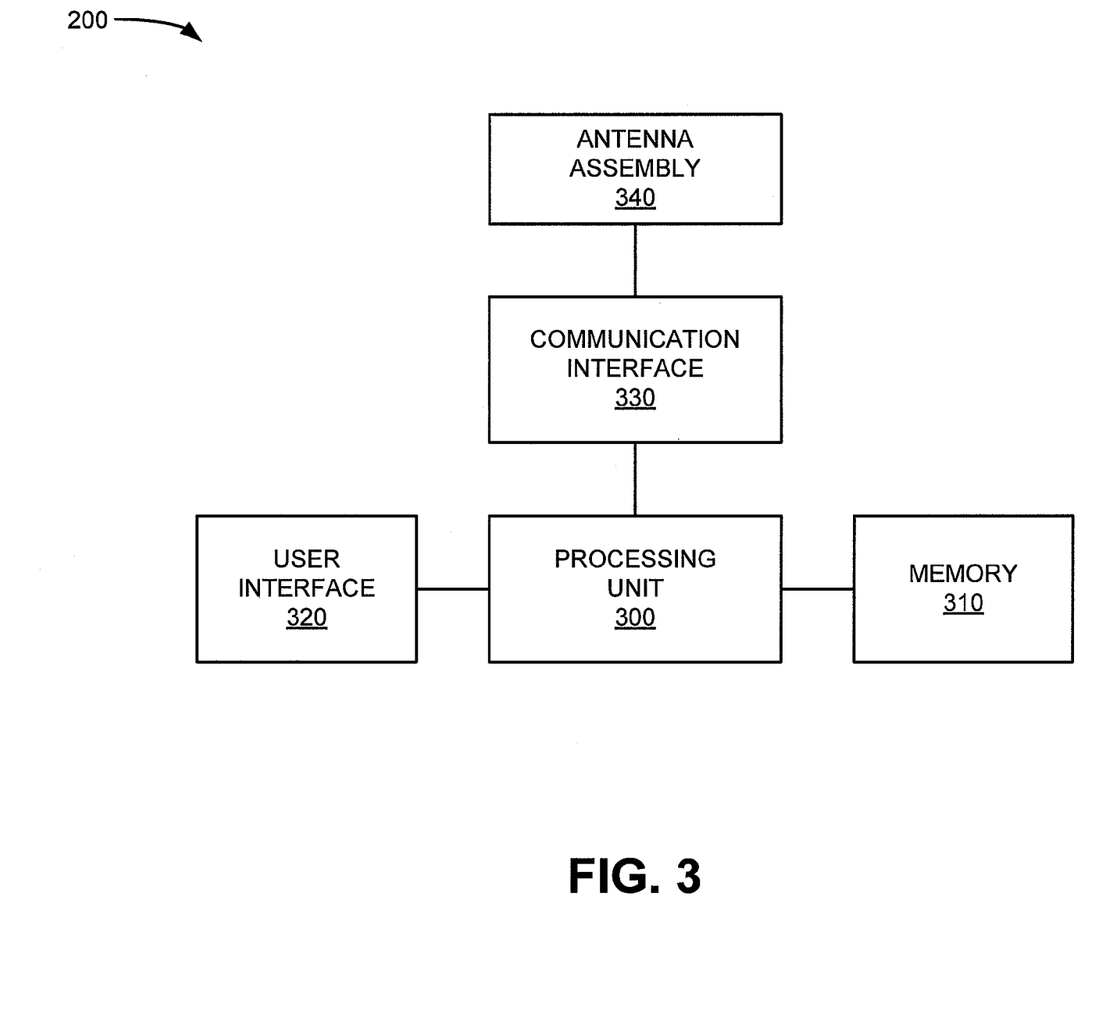
FIG. 3 depicts a diagram of exemplary components of the device illustrated in FIG. 2.

FIG. 3 is a diagram of exemplary components of device 200. As illustrated, device 200 may include a processing unit 300, a memory 310, a user interface 320, a communication interface 330, and/or an antenna assembly 340.

Processing unit 300 may include one or more processors, microprocessors, application specific integrated circuits (ASICs), field programmable gate arrays (FPGAs), or the like. Processing unit 300 may control operation of device 200 and its components. In one implementation, processing unit 300 may control operation of components of device 200 in a manner described herein.

Memory 310 may include a random access memory (RAM), a read-only memory (ROM), and/or another type of memory to store data and instructions that may be used by processing unit 300. In one implementation, memory 310 may store data used to display a graphical user interface, such as graphical user interface 100 on display 230.

User interface 320 may include mechanisms for inputting information to device 200 and/or for outputting information from device 200. Examples of input and output mechanisms might include buttons (e.g., control buttons 240, keys of keypad 250, a joystick, etc.); a speaker (e.g., speaker 220) to receive electrical signals and output audio signals; a microphone (e.g., microphone 260) to receive audio signals and output electrical signals; a display (e.g., display 230) to receive touch input and/or to output visual information (e.g., time-related items received by device 200); a vibrator to cause device 200 to vibrate; and/or a camera to receive video and/or images.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processing unit 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, one or more components of device 200 may perform one or more other tasks described as being performed by one or more other components of device 200.

Figure 4:
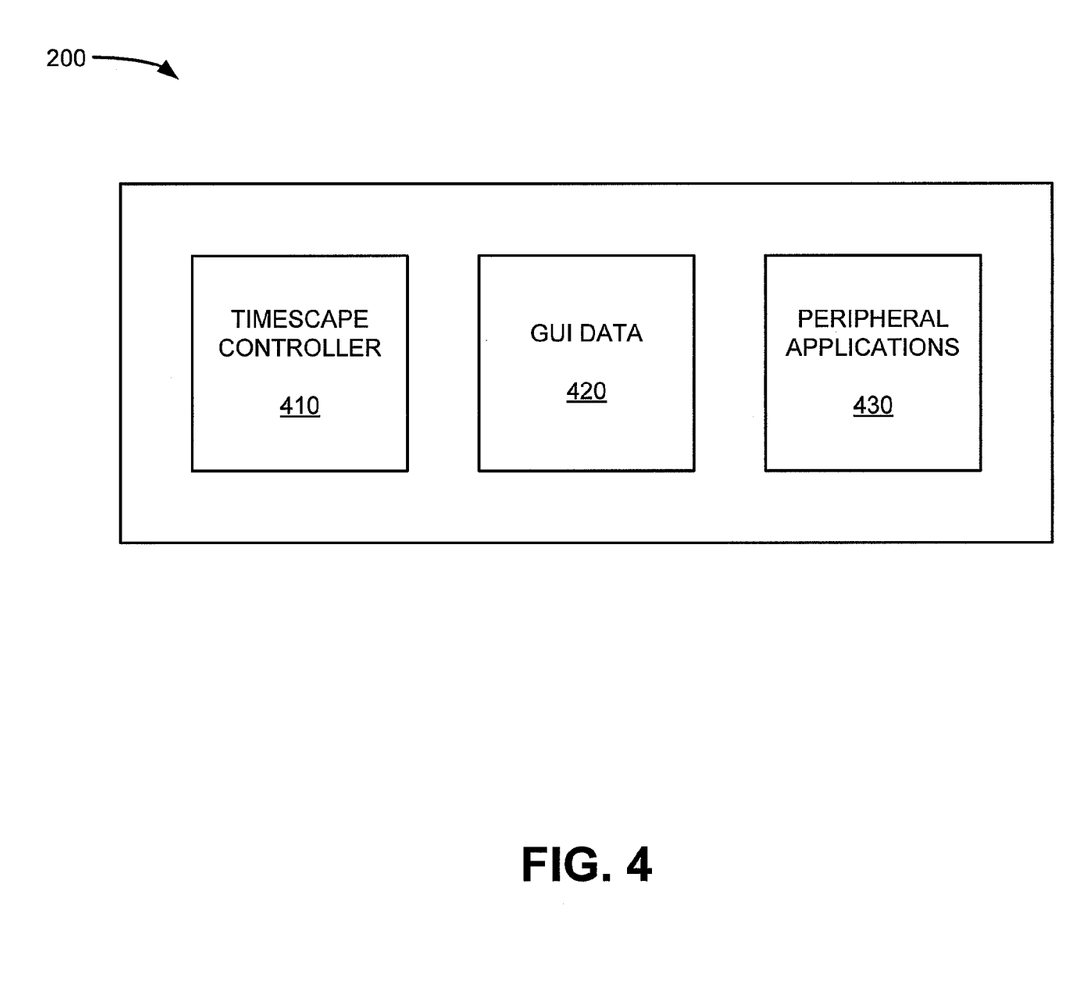
FIG. 4 depicts a diagram of exemplary functional components of the device illustrated in FIG. 2.

FIG. 4 provides a diagram of exemplary functional components of device 200. As shown in FIG. 4, device 200 may include a timescape controller 410 and graphical user interface (GUI) data 420. Device 200 may also include other peripheral applications 430 that provide communication and other services for device 200.

Timescape controller 410 may generate and continuously update a moving timeline for a graphical user interface (e.g., graphical user interface 100). Timescape controller 410 may also receive time-related items from other applications within device 200 and create a time-related graphic (e.g., time-related graphic 120) for each time-related item. Time-related items may include, for example, incoming email messages, IMs, short message service (SMS) messages, multimedia messaging service (MMS) messages, missed telephone calls, voicemails, reminders for calendar items, reminders for task lists, and the like. Timescape controller 410 may communicate with applications that receive and/or generate time-related messages to identify new time-related messages.

Timescape controller 410 may identify basic information about each time-related item (e.g., the sender, time received, and type of item) and create a time-related graphic for each time-related message based on the basic information. In one implementation, timescape controller 410 may assemble time-related graphic based on one or more templates. For example, timescape controller 410 may retrieve, from GUI data 420, an image representing the peripheral application associated with the time-related item and/or representing a sender associated with the time-related item, and insert the image(s) into a graphic template. Time-related graphics are discussed in more detail with respect to FIGS. 5A-5D below.

In an exemplary implementation, timescape controller 410 may also generate graphics for astronomic and/or weather conditions relevant to a location. Astronomic and/or weather data may be received from one of peripheral applications 430. Timescape controller 410 may use the astronomic and/or weather data to generate representations of current conditions using, for example, images stored in GUI data 420. The graphics for astronomic and/or weather conditions may be displayed, for example, as environmental indicator 150 of FIG. 1.

In another exemplary implementation, timescape controller 410 may generate graphics relevant to a particular location. Geographic location information may be received from one of peripheral applications 430. Timescape controller 410 may associate images with the geographic location information. The images may be associated with a location based on, for example, user preferences and/or factory default settings. Images may be stored, for example, in GUI data 420. The graphics relevant to a particular location may be displayed, for example, as landscape area 160 of FIG. 1.

GUI data 420 may include information that may be used by timescape controller 410 to compile time-related graphics. GUI data 420 may include, for example, user preferences, images, and/or triggers related to time-related graphics 120 and graphical user interface 100. User preferences may include, for example, format preferences for time-related graphics 120, the time interval between time indicator 140 and horizon line 130, and/or the display of environmental indicator 150 and landscape area 160. Images may include images associated with geographic locations, astronomic and/or weather images, images representing peripheral applications, panel images for time-related graphic templates, images of user contacts, etc. Triggers related to time-related graphics 120 may include, for example, information about what peripheral applications may initiate a time-relate item. In one implementation, GUI data 420 may also include a history of time-related graphics 120, environmental indicator 150, and landscape area 160 so that a user may scroll back in time to see previously displayed information.

Peripheral applications 430 may include applications that may generate time-related items to be displayed on graphical user interface 100. Peripheral applications may communicate with timescape controller 410 to indicate that a new message (e.g., a newly received message or a newly-generated message) is available to be displayed on graphical user interface 100. Peripheral applications may include, for example, a telephone application, a text-messaging application, an email application, an IM application, a calendar application, an MMS application, an SMS application, etc.

In another implementation, peripheral applications 430 may also include an application to provide astronomic and/or weather conditions relevant to a current location (or other user-indicated location) of the mobile device displaying the graphical user interface. The astronomic and/or weather information may be graphically displayed, for example, as an environmental indicator (e.g., environmental indicator 150) above the receding timeline (e.g., timeline 110) in graphical user interface 100. Displayed astronomic and/or weather conditions may include, for example, a sunrise/sunset corresponding to actual sunrise/sunset times, moon phases, precipitation, etc. An exemplary peripheral application to provide astronomic and/or weather conditions may be, for example, a weather widget. Graphic images to represent astronomic and/or weather conditions corresponding to information received from one of peripheral applications 430 may be stored, for example, in GUI data 420.

In a further implementation, peripheral applications 430 may also include an application to provide geographic position data of the mobile device displaying the graphical user interface. Timescape controller 410 may receive position information from one of the peripheral applications and display an image that may be associated with that location. An exemplary peripheral application to provide geographic position data may be, for example, a global positioning system (GPS) application. The scenes or images relating to the geographic position data may be displayed, for example, in a landscape area (e.g., landscape area 160) around the receding timeline (e.g., timeline 110) in graphical user interface 100. Scenes or images may include, for example, images of a particular area or location within a nearby geographic region (e.g., a landmark or cityscape of the nearest major metropolitan area). In one implementation, a user may select the image to associate with one or more geographic positions.

Figures 5A, 5B, 5C, 5D:
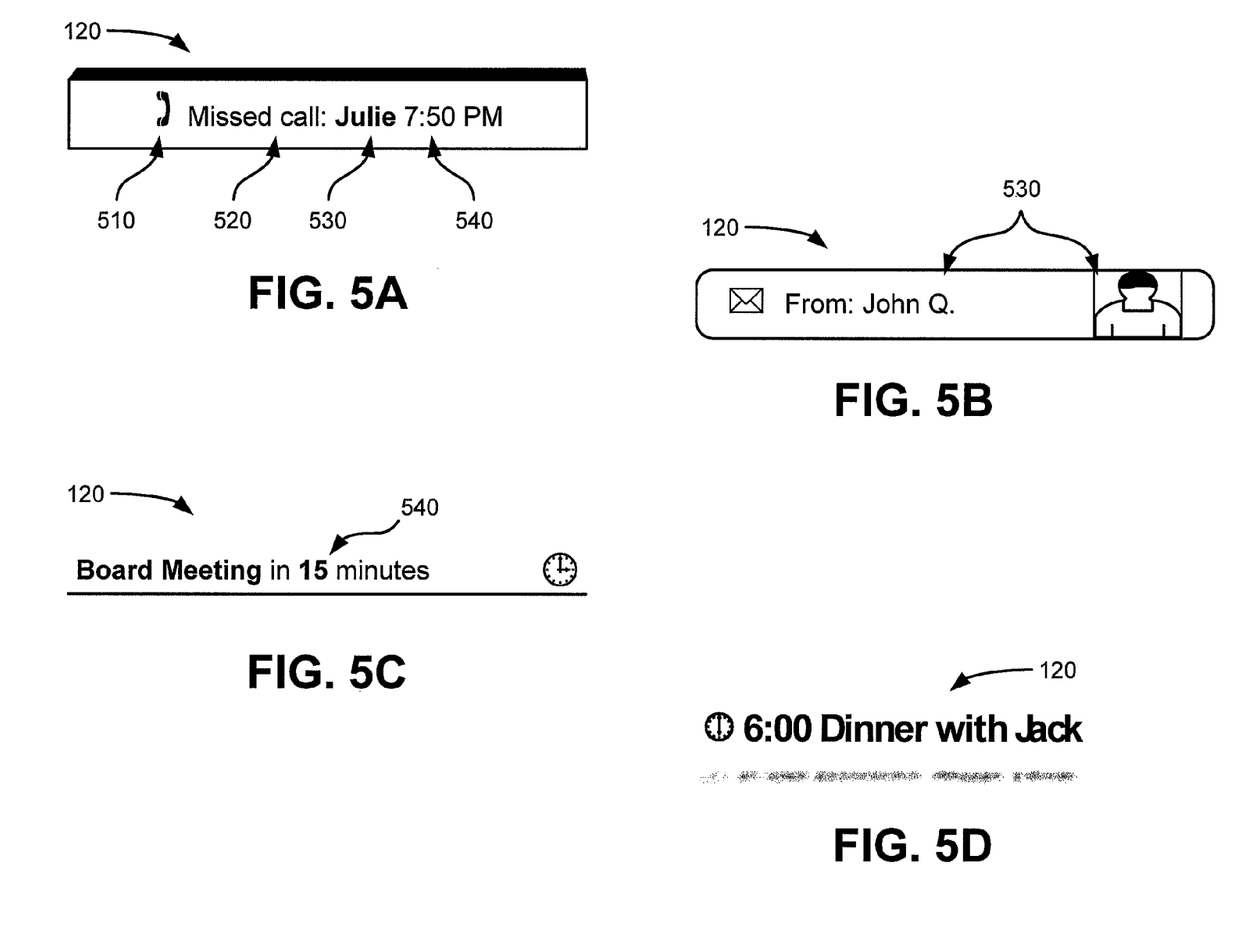
FIGS. 5A-5D provide illustrations of exemplary time-related graphics in accordance with implementations described herein.

FIGS. 5A-5D provide illustrations of exemplary time-related graphics in accordance with implementations described herein. As shown in FIG. 5A, time-related graphic 120 may include, for example, an application identifier 510, a message descriptor 520, a sender indicator 530, and/or a time indicator 540. Application identifier 510 may include a word and/or symbol to indicate an application that generated the time-related item represented by time-related graphic 120. For example, as shown in FIG. 5A, a telephone receiver symbol may be used to indicate that a telephone call was received using a telephone application. Other applications that may generate time-related items may include, for example, an email application (e.g., indicated by an envelope), an IM application (e.g., indicated by a user's IM picture), a calendar application (e.g., indicated by a clock or calendar page), etc.

Message descriptor 520 may include a word and/or symbol to indicate additional information about the time-related item that may not be apparent from the application identifier. For example, as shown in FIG. 5A, the phrase "Missed call:" may be used to indicate that the time-related item generated by a telephone application was a missed call (in contrast with, for example, a voicemail message).

Sender indicator 530 may include a word and/or symbol to indicate a person or object identified with the time-related item represented by time-related graphic 120. For example, as shown in FIG. 5A, the name "Julie" may indicate the name of the caller. The caller's name may be determined, for example, based on caller identification software in a telephone application of device 200 that associates an incoming call number with a name stored in a contact list of device 200. Sender indicator 530 may include other indications, such as a phone number, email address, IM handle, "unknown" indication, etc. In an exemplary implementation, as shown in FIG. 5B, a sender's picture or another image associated with the sender may be included in time-related graphic 120, if available.

Time indicator 540 may include a word and/or symbol to indicate the time that the time-related item represented by time-related graphic 120 was received by an application within device 200. For example, as shown in FIG. 5A, the time "7:50 PM" may indicate the time the missed call from Julie occurred. In some implementations, time indicator 540 may be presented in actual time formats (e.g., 12-hour or 24-hour time). In other implementations, time indicator 540 may be presented in relative time formats (e.g., "20 minutes ago). For example, as shown in FIG. 5C, time indicator 540 may include a relative time format "in 15 minutes" to indicate an upcoming event listed on a user's calendar application. Other implementations may use a combination of actual and relative time formats depending on the type of time-related item that is being presented in time-related graphic 120.

FIGS. 5A-D also provide exemplary image formats for time-related graphic 120. For example, FIG. 5A depicts time-related graphic 120 as a three-dimensional panel. FIG. 5B depicts time-related graphic 120 as a flat panel. FIG. 5C depicts time-related graphic 120 as using simple text. FIG. 5D depicts time-related graphic 120 as including shadows and/or a reflective appearance. While FIG. 5A-D include exemplary elements that may be included in time-related graphic 120, in other implementations, time-related graphic 120 may contain fewer, different, differently arranged, or additional elements than depicted in FIGS. 5A-5D.

Figure 6:
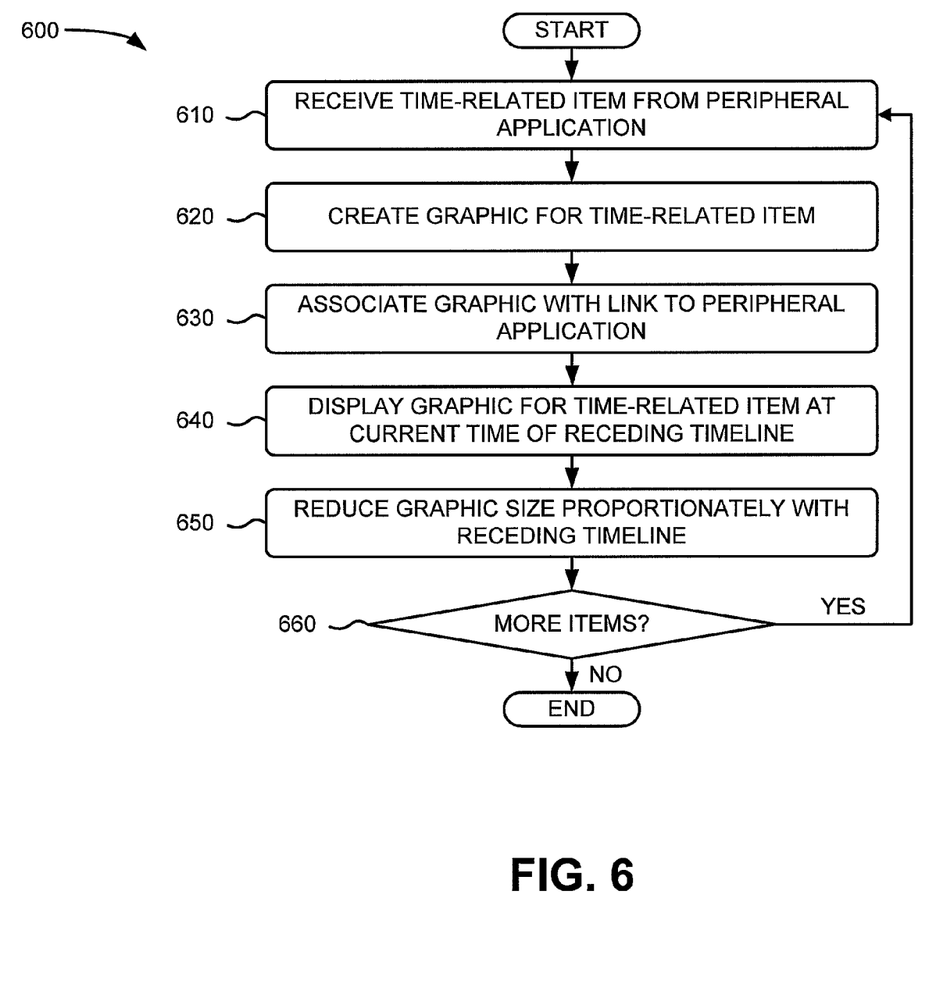
FIG. 6 depicts a flow chart of an exemplary process for presenting a time-based graphical user interface according to implementations described herein.

FIG. 6 depicts a flow chart of an exemplary process 600 for presenting a time-based graphical user interface according to implementations described herein. In one implementation, process 600 may be performed by device 200. For simplicity, specific examples of process 600 herein may be described in the context of device 200 presenting a time-based graphical user interface for a missed telephone call from "Sally" at 6:23 AM.

As illustrated in FIG. 6, process 600 may begin with displaying a receding timeline, such as timeline 110 of FIG. 1. The receding timeline may include a starting point at a current time that is updated with the changing time. A time-related item from a peripheral application may be received (block 610). For example, device 200 (e.g., timescape controller 410) may receive a message indication from a peripheral application (e.g., one of peripheral applications 430), such as a telephone application, an email application, or an IM application of device 200. Alternatively, device 200 may receive a reminder indication from a calendar application. In an exemplary implementation, if device 200 receives a telephone call that is not picked up by the user, the telephone application may provide an indication of the missed telephone call to timescape controller 410. Timescape controller 410 may retrieve information about the missed telephone call, including, for example, the telephone number or identity of the caller (e.g., "Sally"), the time of the call (e.g., 6:23 AM), and/or whether a voicemail message is available.

A graphic for the time-related item may be created (block 620). For example, device 200 (e.g., timescape controller 410) may create a time-related graphic (e.g., time-related graphic 120) based on information about the time-related item. The time-related graphic may include, for example, an application identifier 510, a message descriptor 520, a sender indicator 530, and/or a time indicator 540 as described above with respect to FIGS. 5A-5D. In the exemplary implementation of a missed telephone call, device 200 may assemble information about the missed call into a time-related graphic that includes a telephone symbol, a message descriptor (e.g., "Missed call"), a telephone number or caller name that is associated with the telephone number (e.g., "Sally"), and the time of the call (e.g., 6:23 AM). Device 200 may assemble the missed call information as a time-related graphic according to default or user-specified criteria for the graphical user interface (e.g., criteria stored in GUI data 420). For example, the symbol, message descriptor, telephone number and time may be presented using a particular font, font size, and arrangement. The arrangement may include, for example, information presented as free text (e.g., FIG. 5C or 5D) or a simulated panel (e.g., FIG. 5A or 5B).

The graphic may be associated with a link to the peripheral application (block 630). For example, device 200 (e.g., timescape controller 410) may associate the time-related graphic with a link to activate the peripheral application (e.g., one of peripheral applications 430) associated with the time-related item to which the time-related graphic pertains. In the exemplary implementation of a missed telephone call, device 200 may associate the time-related graphic for the missed call with the telephone application that initiated the missed call message. Thus, by selecting the time-related graphic (e.g., by the user touching a touch-enabled display 230), a user may activate the telephone application. Associating the graphic with a link to the peripheral application may be optional to process 600.

The graphic for the incoming item may be displayed at a current time of the receding timeline (block 640). For example, device 200 (e.g., timescape controller 410) may display the time-related graphic in the forefront of a timeline (e.g., timeline 110) that scrolls toward a horizon (e.g., horizon line 130). In the exemplary implementation of a missed telephone call, device 200 may display the time-related graphic for the missed telephone call at the forefront of the receding timeline that corresponds to the current time (e.g., 6:23 AM).

The size of the graphic may be reduced proportionately with the receding timeline (block 650). For example, device 200 (e.g., timescape controller 410) may proportionately decrease the size of the time-related graphic in proportion with the time interval of timeline 110. For example, if the visible length of timeline 110 corresponds to a twelve-hour period, device 200 may gradually reduce the size of the time-related graphic from 100% to 0% over a twelve-hour period. In the exemplary implementation of a missed telephone call, device 200 may display the time-related graphic for the missed telephone call at 100% size at 6:23 AM. The size of the time-related graphic may be reduced gradually until the time-related graphic disappears when it reaches horizon line 130 at 6:23 PM. In other implementations, device 200 may display the time-related graphic until the time-related graphic is no longer practically visible (e.g., 20% of the originally-displayed size).

It may be determined if more items are available to be displayed (block 660). For example, device 200 may (e.g., timescape controller 410) may determine if additional time-related items are available to be processed. If it is determined that no more items are available to be displayed (block 660—NO), then the process ends and device 200 may simply continue to display the currently receding time-related graphics. If it is determined that more items are available to be displayed (block 660—YES), then process 600 may be repeated and a new time-related graphic may be inserted in front of the previously-displayed time-related graphics.

Figure 7A:
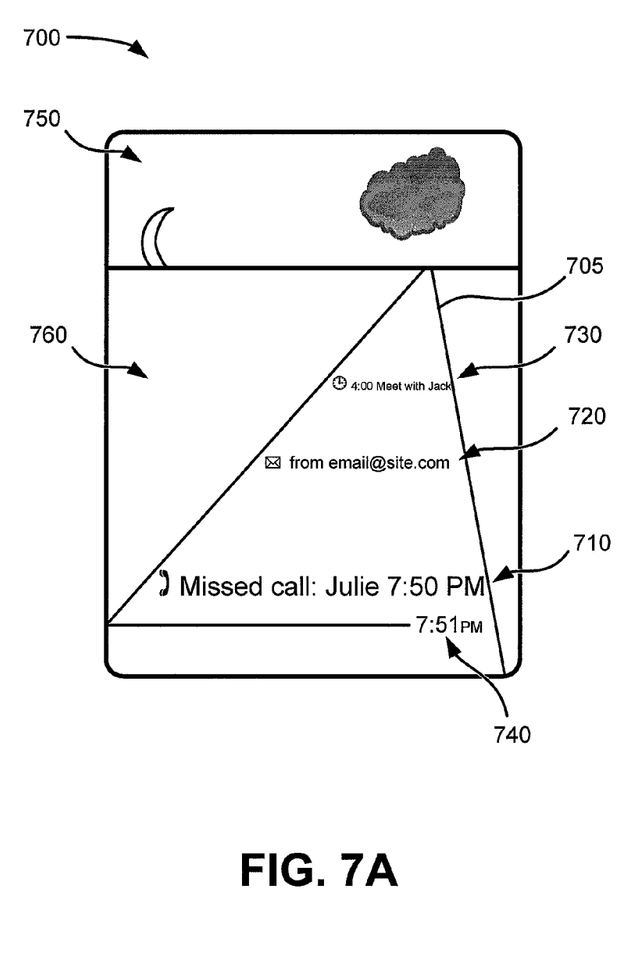
FIGS. 7A and 7B provide an example of a time-based graphical user interface according to implementations described herein.
Figure 7B:
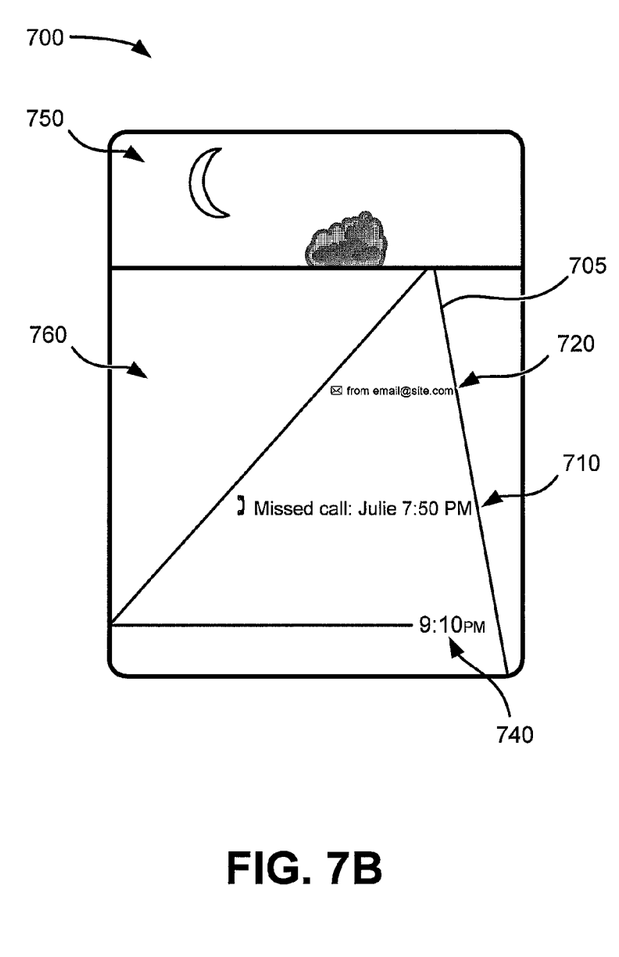

FIGS. 7A and 7B provide an example of a time-based graphical user interface according to implementations described herein. FIG. 7A is an illustration of an exemplary configuration of a graphical user interface 700 at a first time (e.g., 7:51 PM). FIG. 7B is an illustration of an exemplary configuration of graphical user interface 700 at a second time (e.g., 9:10 PM). As shown in FIG. 7A, graphical user interface 700 may display a timeline 705 that includes a missed call message 710, an email notification 720, and a calendar reminder 730. Missed call message 710 may be a time-related graphic for a missed call that occurred at 7:50 PM. Email notification 720 may be a time-related graphic for an email that arrived at 6:30 PM. Calendar reminder 730 may be a reminder for a 4:00 PM meeting that was prompted at 3:30 PM. Current time 740 (e.g., "7:51 PM") may denote the starting point for the receding timeline 705. Thus, the most recent time-related graphic, missed call message 710, may be shown just above current time 740.

Graphical user interface 700 may also include a graphic 750 of astronomic and/or weather conditions, such as a moon phase and/or cloud cover. The weather conditions may be based on, for example, current weather condition information from one of peripheral applications 430. In one implementation, graphic 750 may display graphics corresponding to actual phases of the moon, actual sunrise and sunset times, weather conditions, etc. A landscape area 760 may include a background graphic (e.g., scenery) that may be a fixed scene, a customizable scene selected by the user, or a scene that varies based on the geographic location of the mobile device displaying graphical user interface 700.

As shown in FIG. 7B, current time 740 increased to 9:10 PM. Graphical user interface 700 may display missed call message 710 and email notification 720 as proportionally-smaller-sized time-related graphics. Particularly, missed call message 710 may be shown having receded from the forefront of the timeline that is indicated by current time 740. Similarly, email notification 720 may be shown in a reduced perspective further away from current time 740. In the example of FIG. 7B, calendar reminder 730 is no longer visible. Depending on the configuration of graphical user interface 700, calendar reminder 730 may have exceeded the visible length of timeline 705 or calendar reminder 730 may have been reduced to a size that was practically no longer readable and (based on a particular criteria) was removed from graphical user interface 700.

Figure 8A:
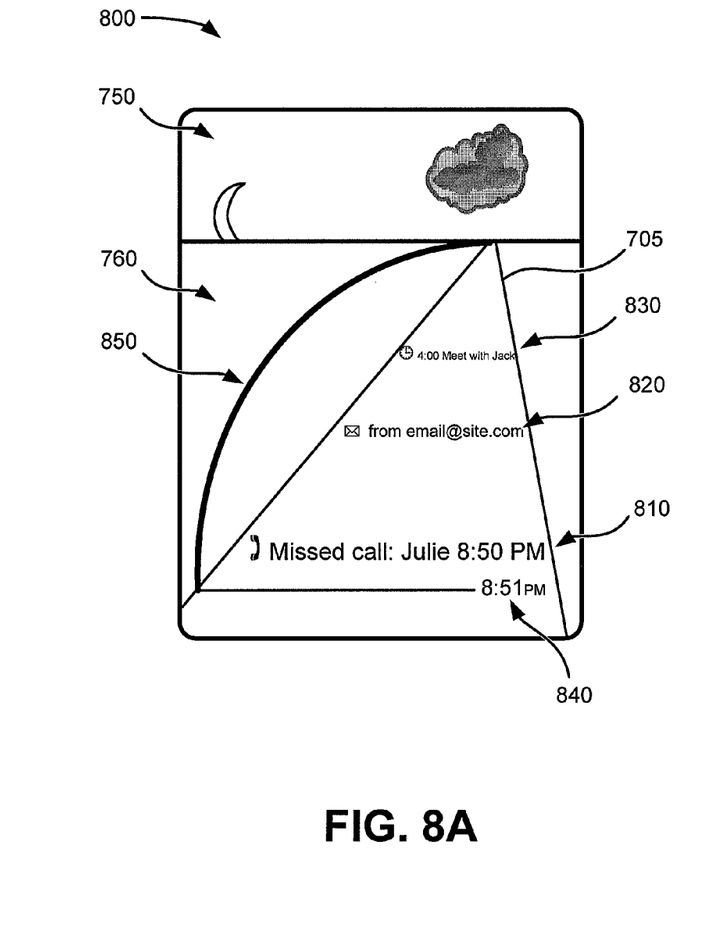
FIGS. 8A and 8B provide an example of another time-based graphical user interface according to implementations described herein.
Figure 8B:
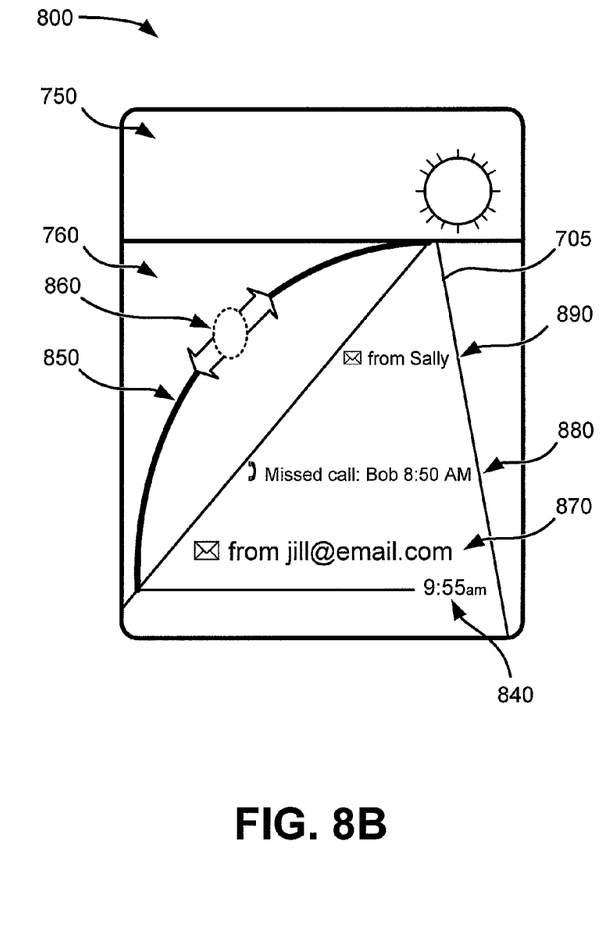

FIGS. 8A and 8B provide an example of another time-based graphical user interface according to implementations described herein. FIG. 8A is an illustration of an exemplary configuration of a graphical user interface 800 at a first time (e.g., 8:51 PM). FIG. 8B is an illustration of an exemplary configuration of graphical user interface 800 at an earlier second time (e.g., 9:55 AM). As shown in FIG. 8A, graphical user interface 800 may display a timeline 705 that includes a missed call message 810, an email notification 820, and a calendar reminder 830. Missed call message 810 may be a time-related graphic for a missed call that occurred at 8:50 PM. Email notification 820 may be a time-related graphic for an email that arrived at 6:30 PM. Calendar reminder 830 may be a reminder for a 4:00 PM meeting that was prompted at 3:30 PM. Time 840 (e.g., "8:51 PM") may denote the starting point for the receding timeline 705. Thus, the time-related graphic just prior to the displayed time of time 840, missed call message 810, may be shown just above time 840. Similar to FIG. 7, graphical user interface 800 may also include a graphic 750 of astronomic and/or weather conditions and a landscape area 760 that correspond to time 840.

Graphical user interface 800 may also include a time-shift arc 850 that provides a user interface to allow a user to scroll back and forth along timeline 705. A user may, for example, select (e.g., via a touch on a touch-sensitive display) a point on time-shift arc 850 and slide along time-shift arc 850 to cause the time-related graphics (e.g., missed call message 810, email notification 820, and calendar reminder 830) to move backward or forward in time. Accordingly, current time indicator may change as the user-selection point slides along time-shift arc 850 and each time-related graphic may diminish or increase in size as moving timeline 705 appears to scroll forward or backward. In one implementation, graphic 750 and landscape area 760 may change to correspond to the selected time on current time 840. Thus, a device (e.g., device 200) may store (e.g., in memory 310) a historical record of time-related graphics, along with the corresponding historical weather graphics 750 and landscape area 760. In one implementation, the time period of time-shift arc 850 may correspond to the time interval between time indicator 840 and the horizon line of timeline 705. In other implementations, time-shift arc 850 may be configured to span a longer or shorter period of time than is displayed by timeline 705.

FIG. 8B show user input 860 (e.g., a touch on a touch-sensitive display) being applied to time-shift arc 850 on graphical user interface 800. Time 840 has moved back to 9:55 AM. Graphical user interface 800 may display a historical set of graphics that correspond to 9:55 AM, including, for example, an email notification (e.g., "from jill@email.com" received at 9:52 AM) a missed call message 880 (e.g., "Missed call: Bob 8:50 AM), and an email notification 890 (e.g., "from Sally" received at 6:20 AM). Each of time-related graphics 870, 880, and 890 may be shown a as proportionally-smaller-sized time-related graphics based on the time they were received. Time-related graphics beyond the time interval between time indicator 840 and the horizon line of timeline 705 may not be shown. User input 860 may slide along time-shift arc 850 to display other time related graphics from other time periods.

While FIGS. 8A-8B include exemplary elements that may be included in graphical user interface 800, in other implementations, graphical user interface 800 may contain fewer, different, differently arranged, or additional elements than depicted in FIGS. 8A-8B. For example, in another implementation time-shift arc 850 may be in a different form (e.g., not an arc) and located elsewhere on graphical user interface 800 relative to timeline 705.

Figure 9:
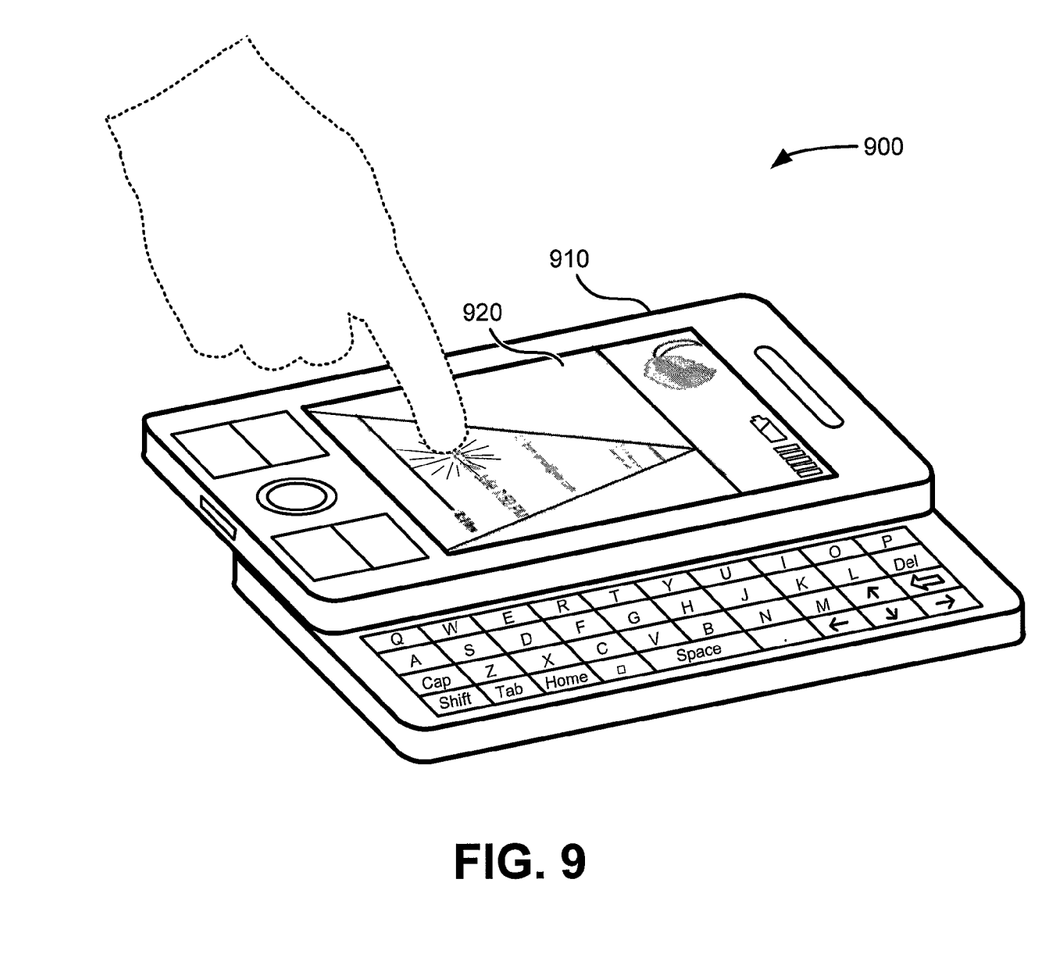
FIG. 9 provides an illustration of an exemplary implementation of a time-based graphical user interface.

FIG. 9 provides an illustration of an exemplary implementation of a time-based graphical user interface. As described herein, systems and methods on exemplary device 900. Device 900 may include housing 910 and a touch-sensitive display 920. Other components, such as control buttons, a keypad, a microphone, a camera, connectivity ports, memory slots, and/or speakers may be located on device 900, including, for example, on a rear or side panel of housing 910.

Device 900 may present a graphical user interface, via a display 920, that includes a continually-moving graphic timeline to provide an indication of time-related items. Each time-related item may include a link to a related peripheral application associated with the time related item. As shown in FIG. 9, user input in the form of a touch on touch-sensitive display 920 may provide a signal to device 900 to open and/or display the peripheral application associated with the time-related graphic selected by the user.

Systems and/or methods described herein may display a moving timeline with a three-dimensional perspective, the timeline being configured to update as the time changes. A plurality of time-related items may be received from a plurality of peripheral applications. A graphic may be created for each time-related item and each graphic may be displayed at a location on the moving timeline based on the time of receipt of the time-related item.

The foregoing description of implementations provides illustration and description, but is not intended to be exhaustive or to limit the invention to the precise form disclosed. Modifications and variations are possible in light of the above teachings or may be acquired from practice of the invention.

For example, while implementations herein have been described primarily in the context of a mobile device (such as a radiotelephone, a PCS terminal, or a PDA), in other implementations the systems and/or methods described herein ma be implemented on other computing devices such as a laptop computer, a personal computer, a tablet computer, an ultra-mobile personal computer, or a home gaming system.

Also, while a series of blocks has been described with regard to FIG. 6, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, the method comprising:
   displaying a receding timeline to fade back toward a horizon, the receding timeline including a starting point at a current time that is updated with a changing time;
   receiving a first time-related item from a peripheral application;
   receiving a second time-related item from the peripheral application, the second time-related item being different than the first time-related item;
   creating a first graphic based on the first time-related item, the first graphic displaying the first time-related item;
   creating a second graphic based on the second time-related item, the second graphic displaying the second time-related item and being different than the first graphic;
   displaying the first graphic, including the first time-related item, at a first point after the starting point of the receding timeline;
   displaying the second graphic, including the second time-related item, at a second point, after the starting point, of the receding timeline; and
   reducing a graphic size of the first graphic proportionally with the changing time of the receding timeline.

2. The computing device-implemented method of claim 1, further comprising:
   associating the first graphic and the second graphic with a link to the peripheral application.

3. The computing device-implemented method of claim 1, further comprising:
   receiving another time-related item from another peripheral application;
   creating a third graphic based on the other time-related item, the third graphic displaying the other time-related item;
   displaying the third graphic, including the other time-related item, at the current time point of the receding timeline.

4. The computing device-implemented method of claim 3, where creating a third graphic based on the time-related item comprises:
   retrieving an image representing the peripheral application associated with the time-related item or a sender associated with the time-related item, and
   inserting the image into a graphic template.

5. The computing device-implemented method of claim 1, where the first graphic and the second graphic each include one or more of:
   a peripheral application identifier,
   a message descriptor,
   a sender indicator, or
   a time indicator.

6. The computing device-implemented method of claim 1, where the peripheral application includes:
   a telephone application,
   a text-messaging application,
   an email application,
   an instant messaging (IM) application,
   a calendar application,
   a multimedia messaging service (MMS) application, or
   a short message service (SMS) application.

7. The computing device-implemented method of claim 1, further including:
   displaying a panel along the receding timeline.

8. The computing device-implemented method of claim 1, where the computing device comprises one or more of:
   a radiotelephone,
   a personal communications system (PCS) terminal, or
   a personal digital assistant (PDA).

9. The computing device-implemented method of claim 1, where the computing device comprises one or more of:
   a laptop computer,
   a personal computer,
   a tablet computer,
   an ultra-mobile personal computer,
   a personal gaming system, or
   a global positioning system (GPS) unit.

10. The computing device-implemented method of claim 1, further comprising:
    receiving a user input to the receding timeline, and
    advancing the timeline, based on the user input, to display previously presented graphics for previous time-related items.

11. A device, comprising:
    a memory to store a plurality of instructions;
    a display; and
    a processor to execute instructions in the memory to:
       present on the display a receding timeline that fades back toward a horizon, the receding timeline including a starting point at a current time that is updated with a changing time,
       receive a first time-related item from a peripheral application,
       receive a second time-related item from the peripheral application, the second time-related item being different than the first time-related item,
       generate a first graphic based on the first time-related item, the first graphic displaying the first time-related item,
       generate a second graphic based on the second time-related item, the second graphic displaying the second time-related item and being different than the first graphic,
       display the first graphic, including the first time-related item, to a first point, after the starting point, of the display of the receding timeline,
       display the second graphic, including the second time-related item, to a second point, after the starting point, of the receding timeline, and
       reduce a graphic size of the first graphic proportionally with the changing time of the receding timeline.

12. The device of claim 11, where the peripheral application includes:
    a telephone application,
    a text-messaging application,
    an email application,
    an instant messaging (IM) application,
    a calendar application,
    a multimedia messaging service (MMS) application, or
    a short message service (SMS) application.

13. The device of claim 11, where the display includes a touch-sensitive display and where the processor further executes instructions in the memory to:
- associate the first graphic and the second graphic with a link to the peripheral application.

14. The device of claim 11, where the device comprises one or more of:
- a radiotelephone,
- a personal communications system (PCS) terminal,
- a personal digital assistant (PDA),
- a laptop computer,
- a personal computer,
- a tablet computer,
- an ultra-mobile personal computer,
- a gaming system, or
- a global positioning system (GPS) unit.

15. The device of claim 11, where the first graphic and the second graphic each include one or more of:
- a peripheral application identifier for the time-related item,
- a message descriptor for the time-related item,
- a sender indicator for the time-related item, or
- a time indicator for receipt of the time-related item.

16. A computing device implemented method, the method comprising:
- displaying a moving timeline with a three-dimensional perspective, the timeline to update with a changing time;
- receiving a plurality of time-related items from a plurality of peripheral applications;
- creating a first graphic for a first one of the plurality of time-related items, the first graphic displaying the first one of the plurality of time-related items;
- creating a second graphic for a second one of the plurality of time-related items, the second graphic displaying the second one of the plurality of time-related items, the second one of the plurality of time-related items being different than the first one of the plurality of time-related items and the second graphic being different than the first graphic;
- displaying the first graphic, including the first time-related item, at a first location on the moving timeline that is based on a time of receipt of the first one of the plurality of the time-related items;
- displaying the second graphic, including the first time-related item, at a second location on the moving timeline that is based on a time of receipt of the second one of the plurality of the time-related items; and
- reducing a graphic size of the first graphic based on the changing time of the moving timeline.

17. The method of claim 16, further comprising:
- reducing the size of the first graphic proportionally based on the three-dimensional perspective of the moving timeline.

18. The method of claim 16, where the first graphic and the second graphic each include one or more of:
- a peripheral application identifier for the time-related item,
- a message descriptor for the time-related item,
- a sender indicator for the time-related item, or
- a time indicator for receipt of the time-related item.

19. A system, comprising:
- means for displaying a receding timeline, the receding timeline receding from a starting point at a current time;
- means for receiving a first time-related item from one of a plurality of peripheral applications;
- means for receiving a second time-related item from one of the plurality of peripheral applications, the second time-related item being different than the first time-related item;
- means for displaying a first graphical representation, including the first time-related item, at a first location on the receding timeline, the first location based on a time of receipt of the first time-related item;
- means for displaying a second graphical representation, including the second time-related item at a second location, based on a time of receipt of the second time-related item, on the receding timeline after the first location, the second graphical representation being different than the first graphical representation; and
- means for reducing a graphic size of the first graphical representation based on a changing time of the receding timeline.

20. The system of claim 19, further comprising:
- means for activating, based on a touch from a user, one of the plurality of peripheral applications associated with at least one of the first graphical representation or the second graphical representation.

* * * * *